No. 762,150. PATENTED JUNE 7, 1904.
H. E. DADE.
BINDER.
APPLICATION FILED JUNE 21, 1899.
NO MODEL. 5 SHEETS—SHEET 1.
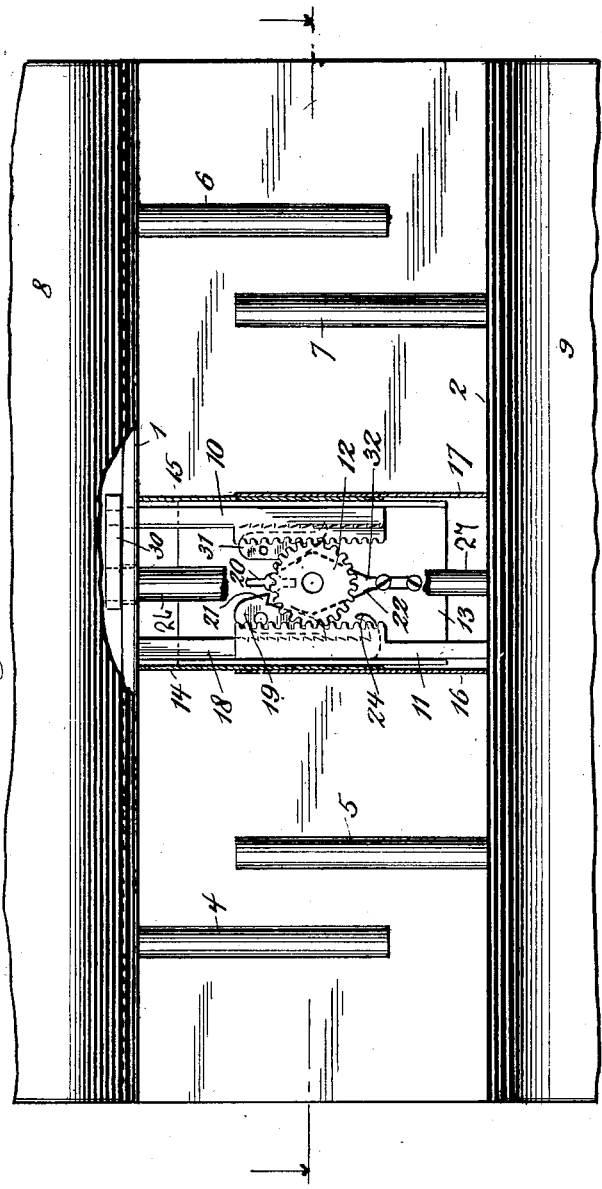
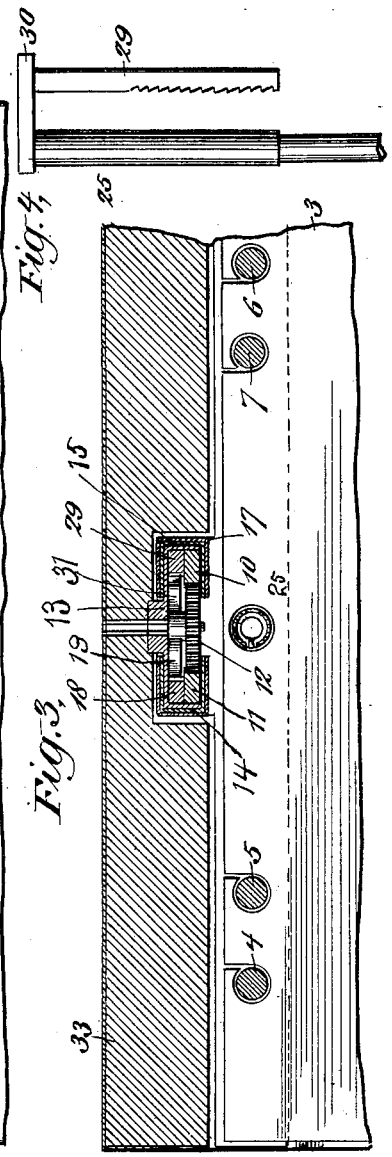
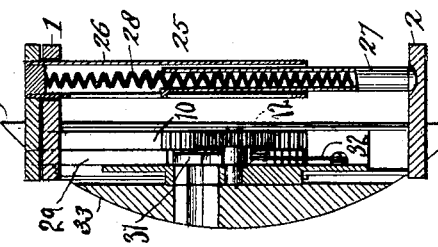
WITNESSES:
INVENTOR
Harry E. Dade.
BY
Nicholas M Goodrich
his ATTORNEY No. 762,150. PATENTED JUNE 7, 1904.
H. E. DADE.
BINDER.
APPLICATION FILED JUNE 21, 1899.
NO MODEL. 5 SHEETS—SHEET 2.
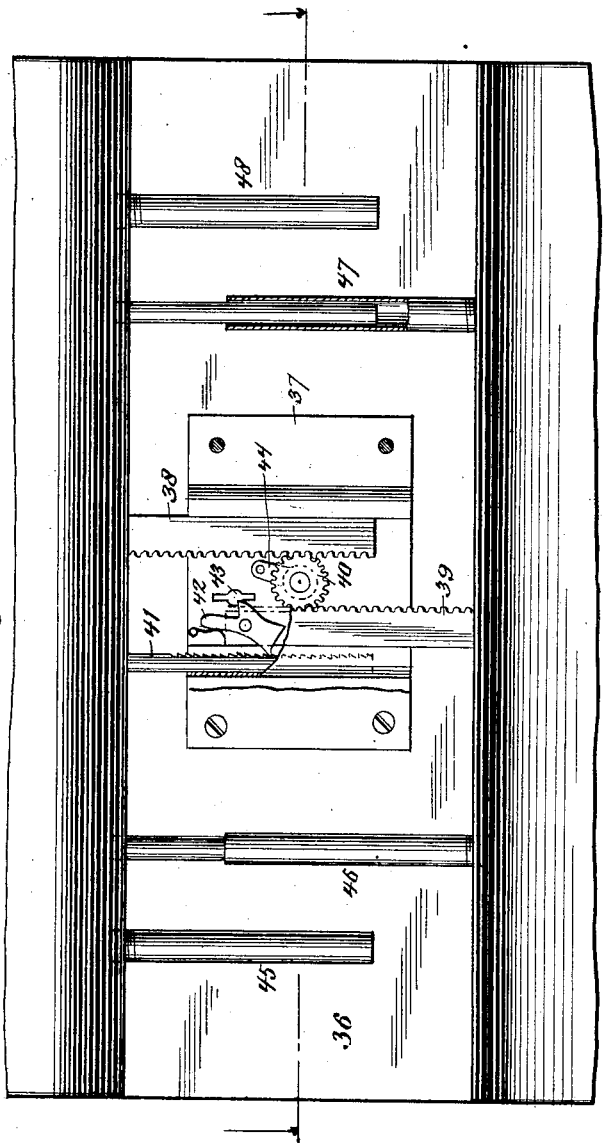
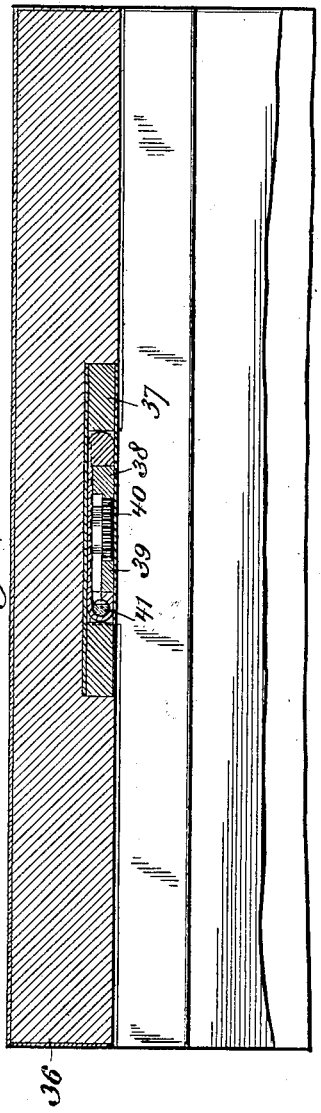
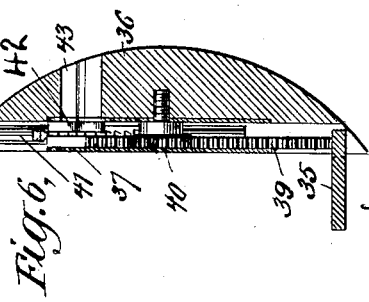
WITNESSES:
INVENTOR
Harry E Dade
BY
Nicholas N Goodlett,
ATTORNEY No. 762,150. PATENTED JUNE 7, 1904.
H. E. DADE.
BINDER.
APPLICATION FILED JUNE 21, 1899.
NO MODEL. 5 SHEETS—SHEET 3.
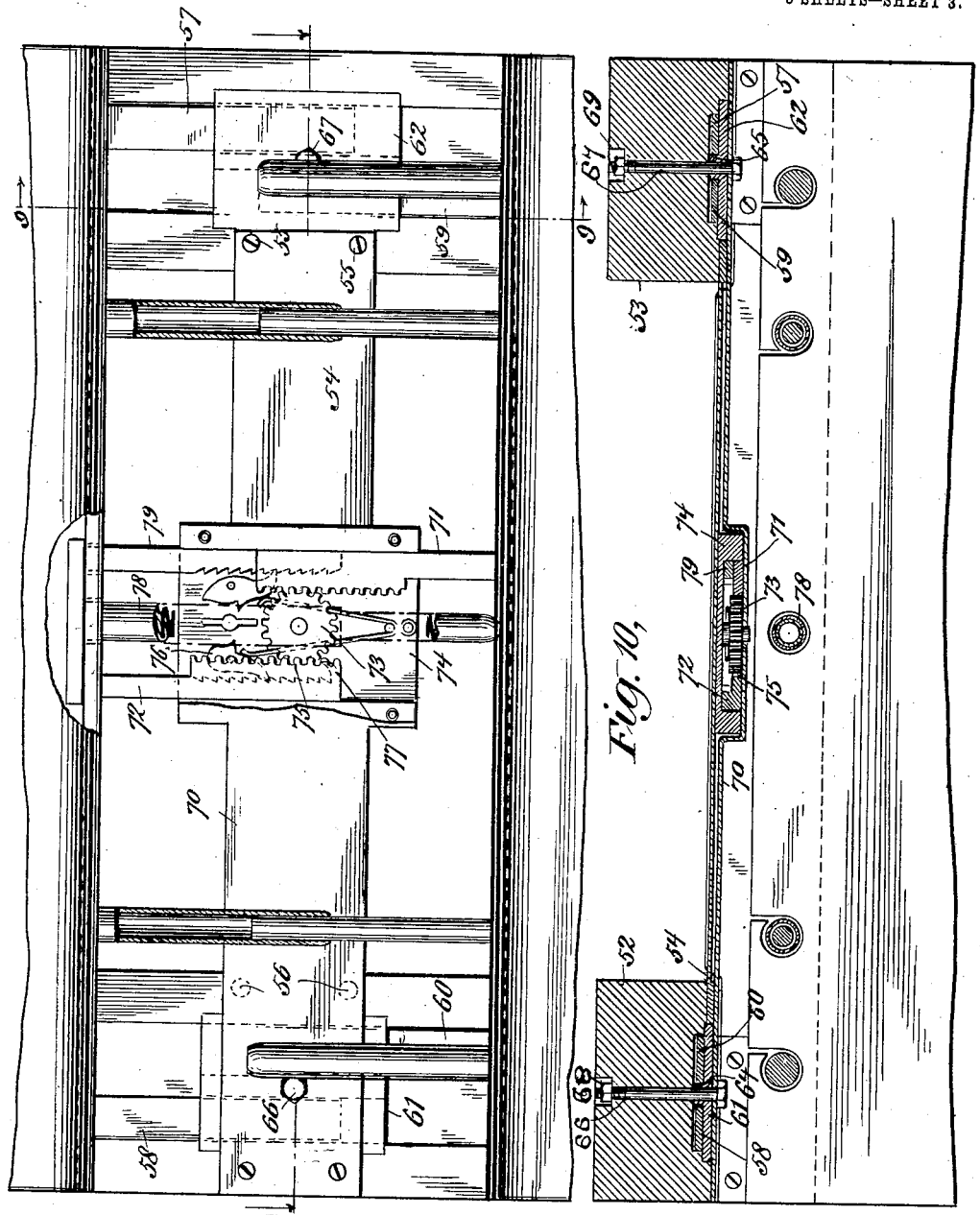
WITNESSES:
INVENTOR
Harry E. Dade
BY
his ATTORNEY No. 762,150. PATENTED JUNE 7, 1904.
H. E. DADE.
BINDER.
APPLICATION FILED JUNE 21, 1899.
NO MODEL. 5 SHEETS—SHEET 4.
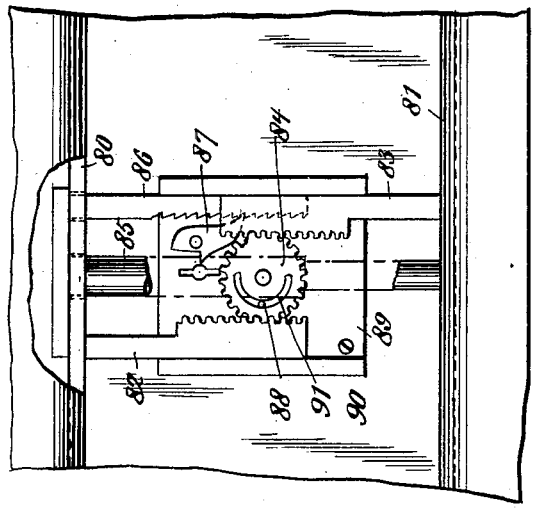
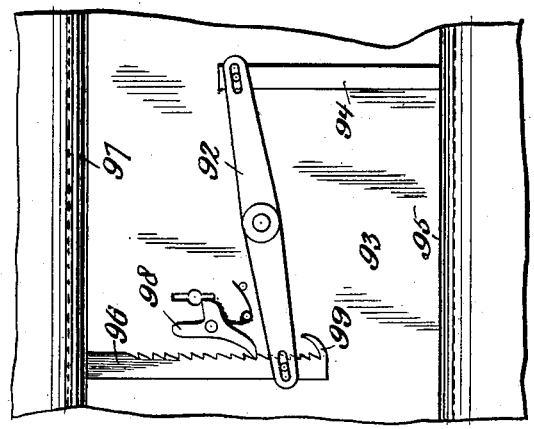
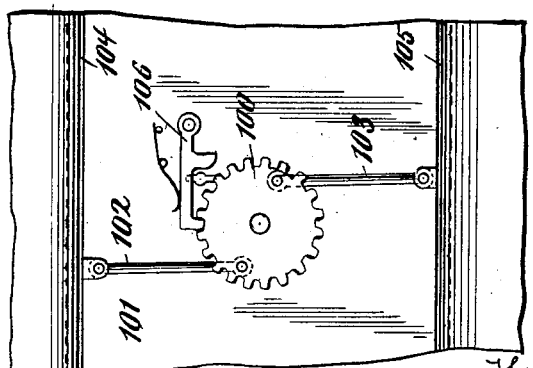

No. 762,150. PATENTED JUNE 7, 1904.
H. E. DADE.
BINDER.
APPLICATION FILED JUNE 21, 1899.
NO MODEL. 5 SHEETS—SHEET 5.
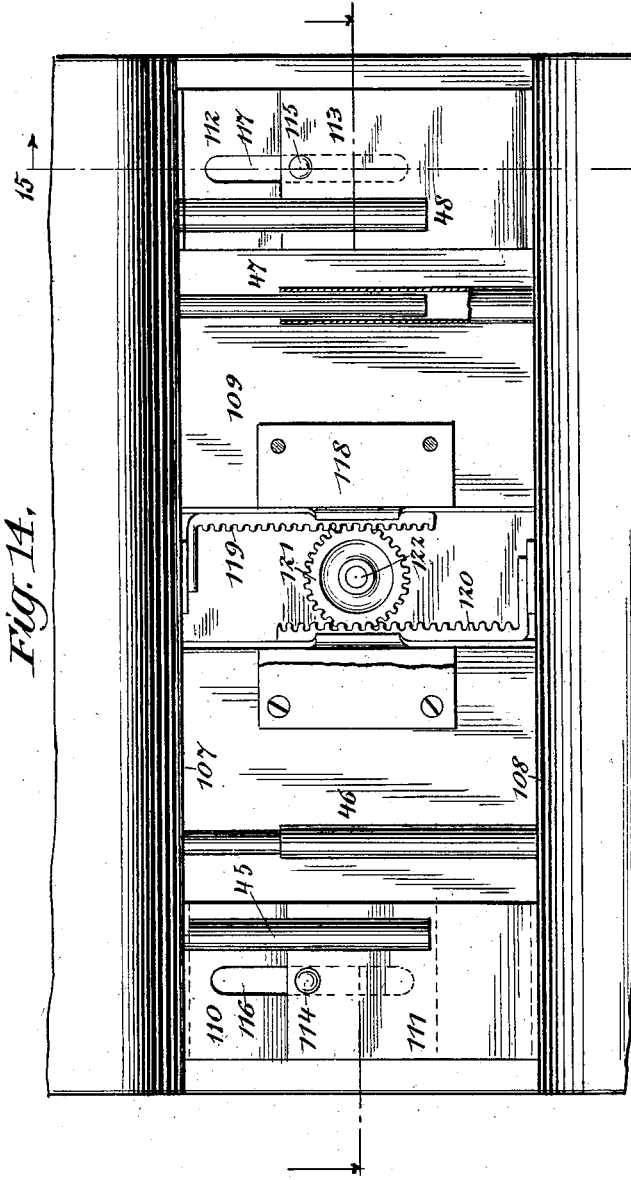
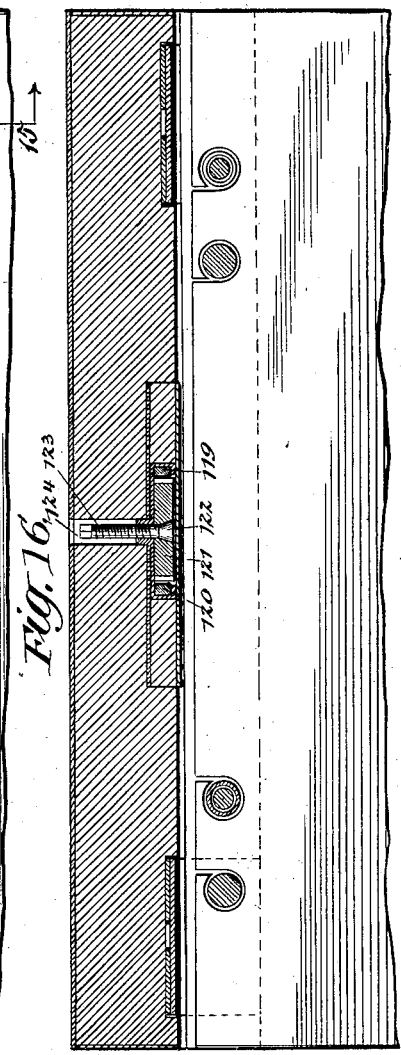
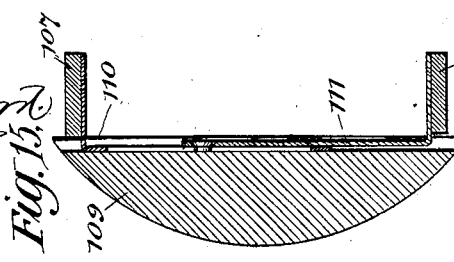
WITNESSES: INVENTOR
Harry E. Dade
BY
Nicholas M. Goodlett Jr.
his ATTORNEY No. 762,150. Patented June 7, 1904.

UNITED STATES PATENT OFFICE.

HARRY E. DADE, OF MOUNT VERNON, NEW YORK.

BINDER.

SPECIFICATION forming part of Letters Patent No. 762,150, dated June 7, 1904.

Application filed June 21, 1899. Serial No. 721,275. (No model.)

*To all whom it may concern:*

Be it known that I, HARRY E. DADE, a citizen of the United States, and a resident of Mount Vernon, in the county of Westchester and State of New York, have invented certain new and useful Improvements in Binders, of which the following is a specification.

This invention relates to binders. It seeks, among other things, to provide in an expansible binder having upper and lower binding-strips a quick-acting arrangement, whereby these strips in moving to and from each other will always move equal distances, so as to be kept at equal distances from a definite imaginary or real medial point or line; to provide in such a binder a back so arranged that a definite medial line thereof will be maintained always equally distant from the said strips; to provide a binder with a convenient curved back, on which the binder when opened on a desk may turn, so as to present the sheets in substantially a horizontal position for the purpose of convenience in writing; to provide in a binder an efficient and convenient lock; to provide a binder having sheet-engaging posts adapted to keep the sheets in the binder at all times in accurate alinement; to provide in a binder fixed and removable posts of special arrangement designed to engage open and closed holes in the sheets, and in general to improve the construction of binders.

The objects of the invention are effected by the features and combination of features hereafter set forth, although it is not essential to my invention or some parts thereof that all these features be present at the same time in a binder.

In the drawings forming part of this specification, and in which like reference-numerals designate corresponding parts throughout, I have shown some of the various embodiments of which my invention is susceptible.

Figure 1 is a plan view of one form of the invention, parts being broken away. Fig. 2 is a central transverse section thereof. Fig. 3 is a central longitudinal section thereof. Fig. 4 shows a detail partly broken away. Figs. 5, 6, and 7 are views similar to Figs. 1, 2, and 3, but showing a different arrangement, the posts being omitted in Fig. 6. Figs. 8, 9, and 10 are views similar to Figs. 1, 2, and 3, but showing still another arrangement, Fig. 9 being taken on the line 9 9 of Fig. 8. Figs. 11, 12, and 13 are plan views showing certain other modifications. Figs. 14, 15, and 16 are views similar to Figs. 1, 2, and 3, Fig. 15 being taken on the line 15 15 of Fig. 14 and showing a modification.

Referring now more particularly to the various features of the invention, and first the form shown in Figs. 1, 2, 3, and 4, the binder is provided with the upper and lower strips 1 and 2, between which the sheets 3 are held removably in place. These strips are preferably provided with sheet-posts designed to engage holes in the sheets. 4 and 5 designate one pair of overlapping sheet-posts fixed, respectively, at their outer ends to the strips 1 and 2 and free at their inner ends. 6 and 7 designate another similar pair of sheet-posts, both pairs engaging open holes in the sheets, as shown in Fig. 3. The strips are arranged for limited movement to and from each other, so as to enable the binder to be expanded for the insertion or removal of sheets, as occasion may require. The strips cannot, however, in the preferred arrangement, as shown, be separated far enough to leave a space between the inner ends of the lower posts and the inner ends of the upper posts, so that thus the sheets in the binder will be engaged by the posts whatever may be the distance between the strips. Of course, if desired, the strips may be arranged to be separated far enough apart to leave a space between the inner ends of the upper and lower posts. Each of the posts 4, 5, 6, and 7 is preferably of uniform diameter throughout and fits closely the holes in the sheets engaged thereby, so that the sheets will always be kept in accurate alinement. The strips 1 and 2 are hinged in the usual manner to the covers 8 and 9. The strips are provided with means connecting them together and so arranged as to compel the strips to move equally to and from each other and arranged for quick action by simply pulling the strips apart or pushing them together. In this arrangement of means 10 and 11 are two arms rigidly connected at their outer ends, respectively, to the upper and lower strips. The inner ends of these arms overlap each other and are free, being provided with rack-teeth which mesh with the toothed wheel 12 on opposite sides thereof, the toothed wheel being pivoted medially and preferably centrally, as shown, between the strips. By this arrangement it will be seen the strips are compelled to move equally to and from each other. The wheel 12 is supported by and pivoted on a piece 13. Beneath the piece 13 is a telescoping casing consisting of two outer U-shaped pieces 14 and 15, fixed to the strip 1, and two similar pieces 16 and 17, fixed to the strip 2. 18 is a toothed arm extending down from the strip 1 and arranged to be engaged by the locking-dog 19, pivoted on the piece 13 and located in proximity to the keyhole 20 in the piece 13, so as to be thrown out of engagement by means of a key engaging the shoulder 21 of the dog 19. The dog 19 is pressed into engagement with the arm 18 by a spring 22, except when retracted by the key. The locking-dog, it will be seen, operates to lock the strips together at any desired point of their separation, and it is desirable after the binder has been unlocked and the strips separated to have the dog with certainty thrown into locking position and without first requiring the key to be withdrawn. I therefore form a hook 24 on the lower end of the arm 18, which in the separating movement of the strips and when the strips have reached the limit of their separation strikes the dog 19 and throws it into locking position, the shoulder 21 turning the key in alinement with the keyhole and permitting it to drop out. The engagement of the dog 19 with the toothed arm 18, caused by the hook 24, prevents, it will be seen, the strips from becoming detached. Thus it will be seen that when the strips are moved together again as far as the sheets will permit they will immediately be locked, even though the key has not been touched. 25 is a removable post comprising upper and lower telescoping tubes 26 and 27. 28 is a spring whose ends bear against the upper and lower ends of the tubes, whereby the post is normally extended. This post extends through an aperture in the strip 1 into connection with strip 2. In order that this post may be locked in place, I provide an arm 29, connected with the post by the plate 30 and extending through an aperture in the strip 1, so that when the post is in position the plate 30 lies above the strip 1. The lower end of the arm 29 is provided with teeth on its inner side, arranged to be engaged by a locking-dog 31, pivoted near the keyhole 20, so as to be acted upon at the same time as the dog 19. The dog 31 is preferably pressed into locking position by the spring 32. When the key strikes the shoulder 21 of the dog 19 in unlocking the binder, a part of the key also strikes the dog 31 above its pivot, so that at the same time the binder is unlocked the removable post is released, which is immediately caused by its spring to rise. When the hook 24 on the arm 18 strikes the dog 19, the movement of the dog thereby caused moves the key out of engagement with the dog 31, so that the latter is returned by its spring into locking position and is able to immediately lock the removable post in place as soon as it is returned to place.

In the best form the invention is provided with a back 33. The back is preferably curved on its outer side and flat on its inner side and is removably secured to the piece 13, so that the strips can move to and fro on the back. The central line of the back is alined with the pivot of the wheel 12, and as the strips are compelled by the devices described to move equally to and from each other the binder when lying open on its back will not be overweighted by either strip.

In the modification shown in Figs. 5, 6, and 7 the strips 34 and 35 are provided with a curved back 36, removably secured to the lock-casing 37, in which move rack-arms 38 and 39, connected to the strips in the same way as shown in Figs. 1, 2, and 3. Pivoted in the casing 37 is a toothed wheel 40, engaged on its opposite sides by the rack-arms, so that the strips move equally together. The strip 34 carries a toothed arm 41, arranged to be engaged by the spring-dog 42, which is adapted to be actuated by a key entering the keyhole 43. An arm 44, carried by the wheel 40, is arranged to strike the dog 42 when the strips have reached their predetermined limit of separation and throws the dog 42 into engagement with the arm 41, so as to prevent the complete detachment of the strips, and turns the key so that it may drop out of the keyhole, and thus constitutes means which accomplishes the same results as the hook 24. (Shown in Fig. 1.) The sheet-engaging posts 45, 46, 47, and 48 are similar to those shown in Fig. 1, except that the posts 46 and 47 are provided with telescoping pieces secured to the upper strip 34.

Referring now to the modification shown in Figs. 8, 9, and 10, the strips 50 and 51 are provided with a curved back consisting of the hubs 52 and 53, detachably secured to the flat strip 54 by screws 55 and 56. Secured to the strip 50 are two arms 57 and 58, and secured to the strip 51 are two arms 59 and 60. The arms 58 and 60 slide side by side in a groove cut in the hub 52 to receive them, and the arms 57 and 59 are likewise arranged, the arms 58 and 60 sliding under the plate 61 and the arms 57 and 59 sliding under the plate 62. These plates have transverse ribs 64 and 65, which separate the sliding arms 58 and 60 from each other and the sliding arms 57 and 59 from each other. Bolts 66 and 67 pass through these plates between the sliding arms and through the hubs 52 and 53, their nuts being sunk in recesses 68 and 69 in the hubs.

The bolts thus detachably and firmly secure the hubs in place. 70 is a strip similar to the strip 54, upon which it lies, except that it is somewhat longer, as shown, and is bent upward in the middle to inclose the locking device and its casing. In this locking device the rack-arms 71 and 72 are secured to the strips 50 and 51 and engage the toothed wheel 73, carried on the casing 74, which is secured in place between the strips 54 and 70 and to the strip 54. The rack-arm 72 is provided with a second set of teeth 75, engaged by the spring locking-dog 76 and with a hook 77, the teeth 75, dog 76, and hook 77 operating in the same way as described with respect to Fig. 1. It will be noted, however, that in Fig. 8 the teeth to be engaged by the locking-dog are formed on the rack-arm itself instead of on a separate arm. In Fig. 8 the removable post 78, having a toothed arm 79 to be engaged by a dog, is shown similar in arrangement and operation to that shown in Fig. 1. The sheet-engaging posts are similar to those shown in Fig. 5. The fixed sheet-posts in the various figures engage open apertures in the sheets, and the removable post engages closed apertures in the sheets, as shown in Figs. 3 and 10.

In Fig. 11 the strips 80 and 81 carry rack-arms 82 and 83, meshing with the toothed wheel 84. The removable post 85 carries the toothed arm 86, locked in place by the dog 87. In this arrangement the dog 87 and the toothed arm 86 are employed to lock the strips together. Complete detachment of the strips is prevented by the pin 88, carried by the lock-casing 89, which is secured to the back 90, the pin 88 running in a slot 91, cut in the wheel 84.

In Figs. 12 and 13 are shown modifications embodying quick-acting means by which the strips are connected together and are compelled to move equally to and from each other. In Fig. 12 a lever 92, pivoted to the back 93, is loosely connected at one end by an arm 94, carried by a strip 95, and at its other end is loosely connected to the arm 96, carried by the strip 97. The strips are locked at any desired point of their separation by the spring-dog 98, which after it is retracted by the key is thrown into locking engagement with the arm 96 by the hook 99, carried on said arm. In Fig. 13 the toothed wheel 100, pivoted on the back 101, is pivotally connected with the inner ends of two arms 102 and 103, whose outer ends are pivotally connected to the strips 104 and 105. The binder is locked by the spring-dog 106, which engages the teeth of the wheel 100 and is operated by a key.

In Figs. 14, 15, and 16 the binding-strips 107 and 108, the curved back 109, and the sheet-posts are similar to those shown in Figs. 5 and 7. The strips 107 and 108, however, have sliding plates 110, 111, 112, and 113, connected together by pins 114 and 115, passing through slots 116 and 117 in the plates, the pins serving to rigidly hold the plates together and guide them evenly in their movement to and from each other. In the lock-casing 118, secured to the back, slide the rack-arms 119 and 120, secured, respectively, to the strips 107 and 108 and engaging the gear-wheel 121, pivoted in the lock-casing. The pivot of the wheel has a tapered head 122 and a threaded shank 123, tapped in the bottom of the lock-casing and projecting into an aperture 124 in the back, so as to be capable of being turned by a key inserted in the aperture. By tightening and loosening the pivot the wheel is locked and made free to turn, and thus the binder is locked and unlocked.

It will be seen that the sheet-posts constitute oppositely-set filing-pins to engage sheets between the strips. These oppositely-set filing-pins may be free at their inner ends and non-telescoping, as shown in Fig. 1, or they may consist of tubes projecting from one strip and oppositely-set posts or pins projecting from the opposite strip and telescoping with the tubular posts, as shown in Figs. 5, 8, and 14, or they may consist of posts or pins, such as the posts 45 and 48 in Figs. 5 and 14, which project from one strip and are free at their outer ends, and the opposite posts or pins, which consist of the tubular sections of the telescopic posts 46 and 47 in said Figs. 5 and 14.

What I claim as new, and desire to secure by Letters Patent, is—

1. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, and removable and fixed posts extending between the strips.

2. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, and fixed posts and an extensible removable post extending between the strips.

3. In a binder, the combination of upper and lower strips movable to and from each other, a rack secured to each of said strips, and a toothed gear-wheel carried on a pivot between the strips and meshing with said racks, and removable and fixed posts extending between the strips.

4. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, and removable and fixed posts extending between the strips, and means for locking the strips together and the removable post in position.

5. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, and removable and fixed posts extending between the strips, and means for locking the strips together and the removable post in position, and a back carrying on its medial line said pivoted piece.

6. In a binder, the combination of upper and lower strips movable to and from each other, a rack secured to each of said strips, and a toothed gear-wheel carried on a pivot between the strips and meshing with said racks, and removable and fixed posts extending between the strips, and means for locking the strips together and the removable post in position.

7. In a binder, the combination of upper and lower strips movable to and from each other, a rack secured to each of said strips, a toothed gear-wheel carried on a pivot between the strips and meshing with said racks, a back carrying said gear-wheel on its central line, removable and fixed posts extending between the strips and means for locking the strips together and the removable post in position.

8. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, means for locking the strips together at any desired position, and means actuated by the movement of the strips to throw said locking means into locking position.

9. In a binder, the combination of upper and lower strips movable to and from each other, a rack secured to each of said strips, and a toothed gear-wheel carried on a pivot between the strips and meshing with said racks, means for locking the strips together at any desired position, and means actuated by the movement of the strips to throw said locking means into locking position.

10. In a binder, the combination of upper and lower strips with means connecting the strips together and arranged so as to permit them to move to and from each other; said means comprising a pair of arms secured at opposite ends to said strips, and a medially-pivoted piece connected on opposite sides of its pivot to said arms, and removable and fixed posts extending between the strips, means for locking the strips together at any desired position and the removable post in place, and means actuated by the movement of the strips to throw said locking means into locking position.

11. In a binder, the combination of upper and lower strips movable to and from each other, a rack secured to each of said strips, and a toothed gear-wheel carried on a pivot between the strips and meshing with said racks, a removable post extending between the strips, means for locking the strips together at any desired position and the removable post in place, and means actuated by the movement of the strips to throw said locking means into locking position.

12. In a binder, the combination of upper and lower strips, means for locking the strips together at any desired position, and means actuated by the movement of the strips to throw said locking means into locking position.

13. In a binder, the combination of upper and lower strips with means connecting the strips together and arranged so as to compel them to move equally to and from each other; said means comprising a pair of arms secured at opposite ends to said strips, and a medially-pivoted piece connected on opposite sides of its pivot to said arms, and removable and fixed posts extending between the strips, and means for locking the strips together and the removable post in position, and removable sheets secured on said posts.

14. In a binder, the combination of two binding-strips; a removable post extending between the strips; an arm carried by said post and extending between the strips; and means fixed between the strips for engaging said arm to lock the post in position.

15. In a binder, the combination of two binding-strips; a removable post extending between the strips and through an aperture in one of the strips; an arm carried by said post and extending between the strips, said arm and post being connected at their upper ends outside of the apertured strip; and means fixed between the strips for engaging said arm to lock the post in position.

16. In a binder, the combination of two binding-strips; a removable extensible post extending between the strips; an arm carried by said post and extending between the strips; and means for engaging said arm to lock the post in position.

17. In a binder, the combination of two binding-strips; a removable extensible spring-post extending between the strips and through an aperture in one of the strips; an arm carried by said post and extending between the strips; said arm and post being connected at their upper ends outside of the apertured strip; and means for engaging said arm to lock the post in position.

18. In a binder, the combination of two binding-strips; a removable post extending through the upper strip and between both strips; means for locking the post in place; and means for automatically lifting the post above the upper strip when said post is unlocked.

19. In a binder, the combination of two binding-strips; an extensible removable post extending through the upper strip and between both strips; means for locking the post in place; and means for automatically lifting the post above the upper strip when said post is unlocked.

20. In a binder, the combination of two binding-strips; a removable post extending through the upper strip and between said strips; means for locking said post in place; and a spring for automatically lifting the post above the upper strip when said post is unlocked.

21. In a binder, the combination of two binding-strips; an extensible removable post extending through the upper strip and between said strips; means for locking said post in place; and a spring for automatically lifting the post above the upper strip when said post is unlocked.

22. In a binder, the combination of two binding-strips; a removable post extending between the strips; means for locking said post in place; and a spring carried by said post for automatically lifting the post from place when said post is unlocked.

23. In a binder, the combination of two binding-strips; a removable tubular telescopic post extending through the upper strip and between both strips, said post containing an internal coiled spring; and means for locking the post in place.

24. In a binder, the combination of two binding-strips; a removable post extending between the strips and carrying one or more locking-shoulders; and means for engaging a shoulder or shoulders of said post to lock the post in place.

25. In a binder, the combination of two binding-strips; a removable post extending between the strips and carrying one or more locking-shoulders; means for engaging a shoulder or shoulders of said post to lock the post in place; and means for automatically lifting the post from place when the post is unlocked.

26. In a binder, the combination of two binding-strips; an extensible removable post extending between the strips and carrying a plurality of locking-shoulders; and means for engaging said shoulders, at various points along the length of the post whereby said post may be locked in place regardless of the length of said post.

27. In a binder, the combination of two binding-strips; an extensible removable spring-post extending through the upper strip and between the strips and carrying a plurality of locking-shoulders; and means for engaging said shoulders, at various points along the length of the post whereby said post may be locked in place regardless of the length of said post.

In testimony whereof I have signed my name to this specification in the presence of two subscribing witnesses.

HARRY E. DADE.

Witnesses:
NICHOLAS M. GOODLETT, Jr.,
GEO. W. MILLS, Jr.